Patented July 16, 1946

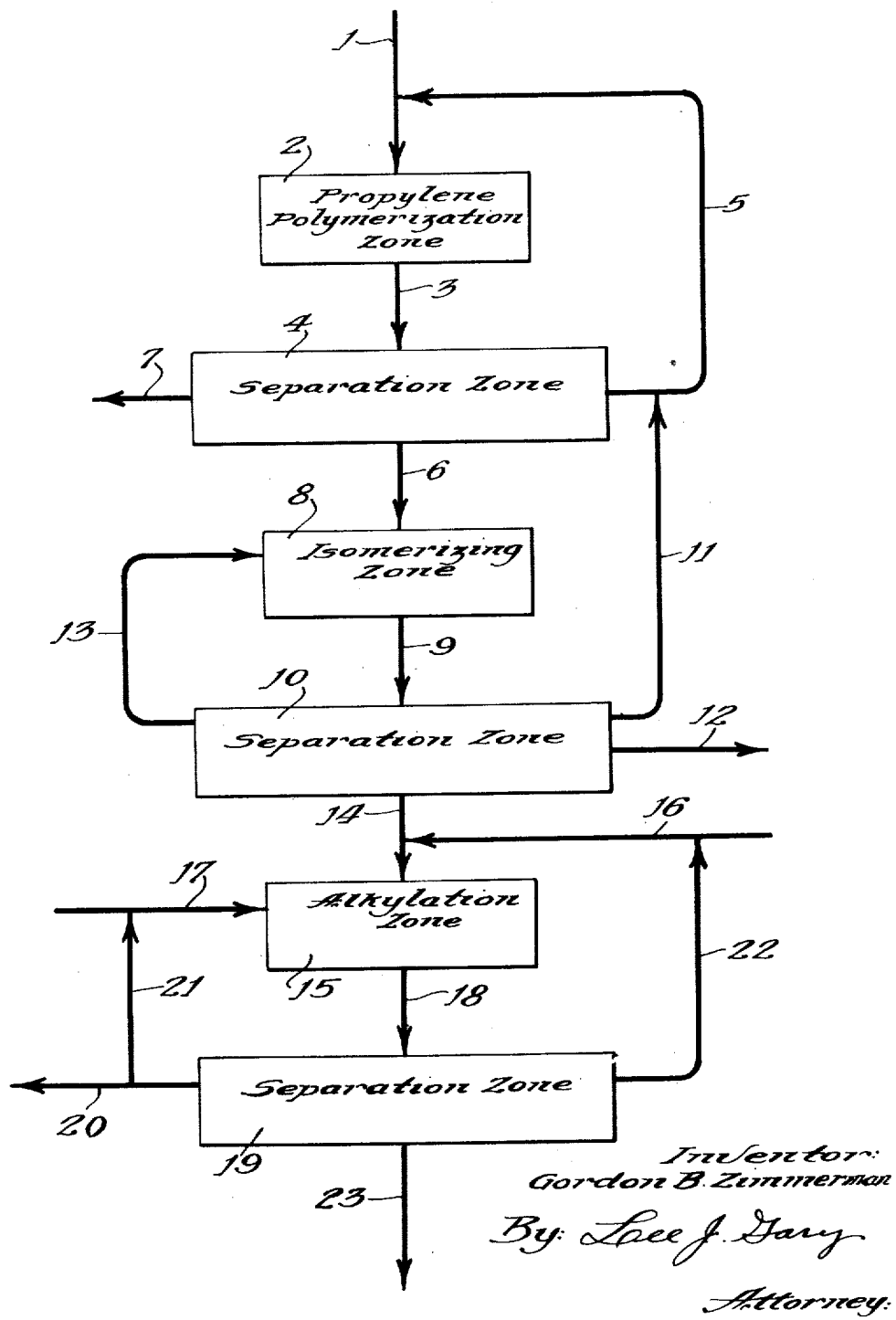

2,404,340

UNITED STATES PATENT OFFICE 2,404,340

PRODUCTION OF HIGH ANTIKNOCK FUEL

Gordon B. Zimmerman, Western Springs, Ill., assignor to Universal Oil Products Company, Chicago, Ill., a corporation of Delaware Application July 19, 1945, Serial No. 605,994

7 Claims. (Cl. 260—671)

This invention relates to a combination of processes in which gasoline boiling range hydrocarbons are produced from hydrocarbons of normally gaseous character. More specifically, the invention relates to a novel combination of catalytic processes for polymerizing propylene, isomerizing the polymers thus produced, and alkylating the isomerized product to yield a high antiknock motor fuel suitable in itself for aviation use or for motor fuel use when blended with other hydrocarbons.

It has previously been proposed to polymerize propylene under certain operating conditions and in the presence of suitable catalysts to produce normally liquid polymers. These polymers usually comprise hydrocarbons of varying chain lengths containing at least one double bond per molecule, depending upon the conditions employed in the polymerization reaction.

It has, also, previously been proposed in the art relating to conversion of hydrocarbons to treat olefin-containing hydrocarbon liquids in the presence of suitable olefin isomerization catalysts under appropriate conditions to effect isomerization of the olefins while maintaining a minimum production of normally gaseous products. In an isomerization reaction of the type obtained in the present process under the operating conditions hereinafter specified, the olefinic polymer not only undergoes an alteration in structure, such as the formation of a highly branched carbon to carbon skeleton, but also a shift in the position of the double bond within the molecule. Moreover, the present process may be operated to accomplish either type of isomerization alone or a combination of each in one step.

In the polymerization of olefinic hydrocarbons, particularly propylene, followed by isomerization of the polymer, highly branched chain products are obtained, the majority of which range in molecular weight from $C_6$ to $C_{12}$ hydrocarbons, depending upon the conditions of polymerization and isomerization. The highly branched chain isomerized polymers of propylene constitute a valuable source of supply of hydrocarbons utilizable in the synthesis of high anti-knock fuels, since it has been shown in the art that branched chain hydrocarbons tend to reduce the knocking tendency of motor fuels in which the said hydrocarbons are present. Moreover, propylene is readily available in large amounts at a low cost, and as such comprises a particularly desirable charge stock to be polymerized. Likewise, propylene polymer, as well as its isomerization product may be produced economically on a large scale; the isomerized propylene polymer, therefore, also comprises a convenient source of hydrocarbon olefins employed in the alkylation step of the present process.

A factor of further significance which may be especially taken advantage of when the source of propylene is considerably detached from the site of utilization is the fact that when propylene is polymerized into liquid polymers the said liquids may be transported more economically and with greater ease than propylene monomer which is ordinarily gaseous. Thus, liquid propylene polymer may be transported in large quantities in tank car lots, whereas propylene itself is preferably liquefied under high pressures and sent to its destination in this condition.

The alkylation product formed by the condensation of isomerized propylene polymers and alkylatable hydrocarbons according to the process of the present invention is characterized by its high octane number and other desirable properties which render it suitable for motor fuel use. I have found that especially preferred products can be obtained from isomerized propylene polymers whereas the non-isomerized propylene polymers yield alkylation products of substantially poorer quality, especially in regard to lower octane number. The present invention concerns particularly the feature of isomerizing the propylene polymers before alkylation. It is, therefore, one object of my invention to provide a process for the production of high anti-knock motor fuels, utilizing isomerized propylene polymers as the charging stock to the alkylation step of the process.

It is another object of this invention to polymerize propylene, subject certain fractions of the propylene polymer to isomerization and utilize at least a portion of said isomerized propylene polymer to alkylate hydrocarbons alkylatable therewith to produce a motor fuel having high antiknock properties.

Still another object of my invention comprises alkylating organic compounds with isomerized propylene polymers, or select fractions thereof, to form highly branched chain derivatives of the said organic compound.

In one specific embodiment the present invention comprises catalytically polymerizing propylene in the presence of a suitable polymerization catalyst and under polymerizing conditions, catalytically isomerizing the propylene polymers thus produced, and alkylating an alkylatable hydrocarbon with at least a portion of said isomerized propylene polymer in the presence of an alkylation catalyst and under alkylating conditions.

The improved results of the present invention are not obtained, for example, when butylene polymers are subjected to isomerization prior to alkylation thereof.

In the alkylation step of the present invention, the aforementioned isomerized polymers of propylene or select fractions thereof are alkylated with any suitable alkylatable hydrocarbon to produce the subsequent high octane number product of the present process. Such alkylatable hydrocarbons, in general, are well known in the art dealing with the alkylation of hydrocarbons. Briefly, the group comprises the saturated paraffinic hydrocarbons such as normal butane, isobutane, normal pentane, isopentane, the cycloparaffinic (naphthenic) hydrocarbons, such as cyclobutane, cyclopentane, cyclohexane, the aromatic hydrocarbons, as for example benzene, toluene, etc., and the homologs and alkyl derivatives of the above classes. A particularly preferred charging stock in the alkylation step of the present process comprises isobutane which yields an isomerized propylene polymer alkylate possessing especially desirable characteristics as a gasoline component from the standpoint of octane number, volatility, etc. The choice of alkylatable hydrocarbon to be utilized in the present process will depend upon the particular alkylate desired. In order to produce an alkylate having the desired volatility, aromatic hydrocarbons will generally be alkylated with the lower molecular weight olefinic isomerized propylene polymers, such as the dimer, for example. On the other hand, low molecular weight paraffins such as propane, butane, isobutane, the pentanes, etc., will yield alkylates having the desired properties of a motor fuel or an aviation gasoline from the isomerized propylene trimers, tetramers, pentamers, and even higher molecular weight propylene polymers. Thus, it is obvious that the polymerization step of the present process will be so directed to yield the specific charge stocks desired in the alkylation step of the process, depending upon the particular alkylatable hydrocarbon utilized.

It may be desirable under some circumstances to prepare highly branched chain hydrocarbons which may be utilized for purposes other than for motor fuel use. The operating conditions employed in any particular instance may then be modified for this purpose, the conditions used depending upon the specific charging stocks employed. In a particularly noteworthy application of the present invention, aromatic hydrocarbons may be alkylated with relatively high molecular weight isomerized propylene polymers, such as the pentamer or hexamer, to produce valuable intermediates for various synthetic products unobtainable from natural or other sources.

The invention will be further illustrated in connection with the following description and the attached flow diagram, the drawing illustrating one specific operation of the process, which, however, should not be construed as unduly limiting the invention in accordance thereto.

The charge stock, comprising predominantly propylene, is introduced through line 1 and directed into propylene polymerization zone 2 wherein the propylene is polymerized under the proper conditions in the presence of a suitable catalyst. These catalysts are well known in the art and include, among others a phosphoric acid, (preferably pyrophosphoric acid), sulfuric acid, aluminum chloride, (preferably in conjunction with hydrogen chloride), and boron trifluoride. The exact conditions of operation to be employed in this step will depend upon the purity of the charge stock and upon the particular degree of polymerization desired, but in general, when a product containing a high proportion of propylene trimer is desired, the polymerization is conducted in the presence of a phosphoric acid, and particularly with a precalcined mixture of phosphoric acid and kieselguhr, known generally in the art as a "solid phosphoric acid catalyst." The process temperature utilized in the polymerization will range from about 180° to about 300° C., the pressure will preferably be superatmospheric and will range from about 200 to about 1500 pounds, or thereabouts, per square inch. Any suitable type of apparatus may be employed and the particular one chosen for this purpose will depend upon the characteristics of the particular catalyst utilized. These are well known in the art at the present time and no novelty for the polymerization process or apparatus per se is claimed in this invention.

The products from polymerization zone 2 are directed through line 3 to separation zone 4, which may comprise one or a plurality of suitable fractionating or distilling zones where the products will be separated into fractions containing the desired polymers. Unconverted propylene which leaves separation zone 4 through line 5 connecting with line 1 is recycled into polymerization zone 2. A polymer fraction boiling below or substantially within the range of gasoline, but preferably containing from about 6 to about 9 carbon atoms per molecule depending on the olefin desired in the subsequent alkylation step is separated in zone 4 and removed through line 6. A relatively small proportion of higher boiling fractions formed in the polymerization reaction may be discharged from the process through line 7 for other uses not related to the present invention.

The desirable propylene polymer fraction which may contain from $C_6$ to $C_{12}$ or higher molecular weight olefinic hydrocarbons or select portions thereof removed from separation zone 4 are withdrawn through line 6 and directed to isomerization zone 8. In this zone the polymers are contacted with suitable catalysts under conditions to effect isomerization thereof into more highly branched chain olefinic hydrocarbons while at the same time producing only a minor amount of normally gaseous products. Any suitable catalyst having olefin isomerization properties may be employed in this step, among which may be mentioned: (1) composites of silica with alumina, zirconia, and/or thoria, either alone or in combination with an inert refractory material such as kaolin, fireclay, diatomaceous earth, pumice, etc., (2) naturally occurring clays which preferably are acid or otherwise chemically treated, (3) aluminiferous materials, including aluminum oxide, (4) aluminum sulphate-containing catalysts, (5) phosphates of certain metals such as alumina, magnesia, etc., (6) fluorides of certain metals such as aluminum, magnesium, etc., and (7) phosphoric acid-containing catalysts. It is understood that these are alternative catalysts and are not exactly equivalent in their action.

The conditions utilized in the isomerization step of the process will depend upon the particular catalyst employed and the particular olefinic polymer treated. In general, with catalysts containing silica composited with alumina, zirconia and/or thoria, temperatures of about 400° to about 600° C., pressures of atmospheric to mildly superatmospheric, up to about 100 atmospheres, and space velocities of about 5 to about 25 volumes of liquid charging stock per hour per unit volume of catalyst may be used. In general, with the phosphate and fluoride types of catalysts, similar pressure and temperature conditions may be employed, but the space velocity may be extended to from about 3 to about 100 volumes of liquid charging stock per hour per unit volume of catalyst. The type of apparatus to be employed is conventional and will likewise depend upon the characteristics of the particular catalyst employed.

The isomerization products are directed through line 9 into separation zone 10 which may comprise one or a plurality of fractionating, distilling, absorbing, and stripping zones, whereby normally gaseous products may be separated from normally liquid products. The normally gaseous products produced in the above named isomerization step, which usually contain a large proportion of propylene, may be removed from separation zone 10 through line 11 which connects with line 5 feeding into line 1 and polymerization zone 2. Thus, the propylene if produced as a by-product from the isomerization reaction, may be recycled through the process to further increase the yields of products therefrom. Other by-products of isomerization, such as hydrogen and/or lower or higher boiling hydrocarbons than propylene, but unsuitable for further processing, may be removed from separation zone 10 through line 12 and thereby discharged from the process. A portion of the products from isomerizing zone 8 may comprise incompletely isomerized hydrocarbons and these may be withdrawn from separation zone 10 through line 13 and returned to isomerizing zone 8 as recycle stock. The fraction vaporizing at the boiling point of the desired propylene polymer may be fractionated further by means not shown on the accompanying diagram to separate nonylenes and/or lower or higher molecular weight olefins therefrom which are utilized in the subsequent alkylation step. Preferably, however, the fraction is separated to concentrate $C_6$–$C_9$ hydrocarbons therein, if the said fraction comprises the preferred charge stock to the alkylation zone as in the case of alkylating isobutane. As an alternative method of operation, it is within the scope of the present invention to supply the total products from isomerizing zone 8 to the subsequent alkylation zone without intervening fractionation. Whatever the charge stock to the alkylation zone, whether the total product from isomerizing zone 8 or a select fraction thereof, it is withdrawn from separation zone 10 through line 14 into alkylation zone 15 in admixture with an alkylatable hydrocarbon introduced through line 16 and connecting with line 14 from sources not indicated on the attached drawing, but hereinafter more fully described.

The present invention here illustrated indicates that the isomerized propylene polymers introduced into alkylation zone 15 are alkylated in commingled state with an alkylatable hydrocarbon supplied through line 16. The characteristics of these hydrocarbons have heretofore been described, but in general, the hydrocarbons may be derived from petroleum distillates or fractions thereof, or they may be produced by various processes involving hydrocarbon conversion processes not related to the present invention.

The hydrocarbons supplied to zone 15 are alkylated therein in the presence of any suitable alkylating catalyst, among which may be mentioned the following: (1) sulfuric acid of 80 to 100% or over concentration (preferably of 90 to 100% acid strength), (2) substantially anhydrous hydrogen fluoride which, however, may contain up to 15% water, (3) anhydrous aluminum chloride, preferably in the presence of hydrogen chloride, (4) boron trifluoride, with or without added hydrogen fluoride, (5) alkyl fluorides or metallic fluoride salts, (6) sulfonic acids of usually alkyl or aromatic derivation, (7) phosphoric acids, generally deposited on various supporting materials such as alumina, or a siliceous material such as kieselguhr, and (8) hydrogen chloride, usually in the anhydrous state. Generally, the preferred catalysts of my invention comprise sulfuric acid of approximately 95% concentration and hydrogen fluoride of 90 to about 95% concentration, although it is to be understood that under suitable conditions the catalyst may be selected from another member of the above group. In utilizing hydrogen fluoride catalyst, the molal ratio of alkylatable hydrocarbon to olefin is generally maintained within the range of about 2:1 to about 10:1, or higher, with space-time values ranging from about 5 to about 80 minutes. The temperature may range from about −30° to about 100° C. (preferably from about 0° to about 50° C.). Superatmospheric pressures are preferred, but usually, pressures in excess of 200 atmospheres are unnecessary, since the catalyst and hydrocarbons in the reactor may be maintained in substantially liquid phase at or below this pressure. The process conditions vary with the particular charge stocks employed, but the broad range of conditions named above will usually satisfactorily apply to most hydrocarbon charge stocks and to the catalysts specified above.

In alkylation reactions involving sulfuric acid as the catalyst, the reactants are maintained at a temperature usually below about 100° C., but not substantially below 0° C. Superatmospheric pressures are preferred as in the case of hydrogen fluoride catalyzed reactions and the catalyst to hydrocarbon ratio may range between about 0.5:1 to about 10:1, the particular ratio depending primarily upon the reaction conditions. In the attached drawing the catalyst is introduced through line 17 into alkylation zone 15 and commingled in the said zone with the mixture of isomerized propylene polymer and alkylatable hydrocarbon introduced into the alkylation zone through line 14. Mixing may be accomplished by suitable agitating devices such as single or multiple stirring paddles, orifice mixers, and/or by means of inert gases introduced under high pressures and at high velocities into the mixture of hydrocarbon and catalyst.

After the reaction period specified above, the products of alkylation zone 15 are directed through line 18 into separation zone 19, which likewise may comprise one or a plurality of suitable fractionating, distilling, absorbing, and/or decanting zones, whereby the catalyst phase and the hydrocarbon phase, which are usually immiscible, may be separated from each other. The catalyst phase may be withdrawn through line 20 to a catalyst recovery or reconcentration plant, not indicated on the drawing or a portion or all thereof may be withdrawn through line 20 and line 21 which connects with catalyst supply line line 17, feeding into alkylation zone 15, thereby providing for the recycling of all or a portion of the catalyst. The hydrocarbon layer separated in separation zone 19 may comprise unalkylated hydrocarbons which may be withdrawn from the said separation zone through line 22 and fed into line 16 to be recycled into alkylation zone 15. The desirable alkylated products removed from separation zone 19 are withdrawn through line 23 into storage or these may be further treated to remove alkyl fluorides or other foreign products formed in alkylation zone 15. The means for treating the alkylation products are not shown on the accompanying diagram but may comprise auxiliary processes such as defluorination towers containing aluminia or other suitable treating agents well known in the art. No novelty for such treating processes or apparatus per se is claimed in the present invention.

The following example is introduced for the purpose of further illustrating the novelty and utility of the present invention, but should not be construed as limiting the same in any of its aspects in accordance thereto.

*Example*

Propylene may be passed over a solid phosphoric acid catalyst at a temperature of 180° C. and at a pressure of 180 pounds per square inch to yield a liquid product comprising primarily propylene trimer having a boiling range of from about 93° C. to about 171° C. and having an octane number of 77.

A $C_6$ to $C_9$ fraction separated from the products of the above polymerization step may be isomerized by passing the hydrocarbons over a silica-alumina-zirconia catalyst at a temperature of 510° C., at atmospheric pressure, and at a space velocity of 15 volumes of liquid charging stock per hour. The resulting isomerized polymer fraction has a clear A. S. T. M. octane number of 81 and a leaded octane number (with 3 cc. tetraethyl lead per gallon) of 83.

A mixture of technical isobutane and the isomerized propylene polymer fraction produced as above containing a molar ration of isobutane to olefin of about 4:1 is charged with an equal volume of hydrogen fluoride into an alkylation reactor at a temperature of 10° C. and with a residence time in the reactor of about 15 minutes. The yield of gasoline boiling range fraction of the alkylation product is about 168%, based upon the weight of polymer fraction charged into the reaction. The alkylate has a clear A. S. T. M. octane number of 89 and a leaded octane number (3 cc. tetraethyl lead per gallon) of 105.

In an alkylation experiment in which process conditions similar to the above are maintained, that is, similar temperatures, pressures, olefin to paraffin ratios, and space time conditions, but utilizing a non-isomerized propylene polymer containing $C_6$-$C_9$ polymers, an alkylate is obtained containing a gasoline boiling range fraction having a clear A. S. T. M. octane number of 79. The leaded octane number for the same fraction (3 cc. of tetraethyl lead per gallon) is 87.

The results indicated by the above comparison show conclusively the advantages obtained by isomerizing the propylene polymer prior to alkylation.

I claim as my invention:

1. The process which comprises polymerizing propylene, subjecting at least a portion of the resultant polymers to the action of an olefin isomerizing catalyst at isomerizing conditions, and alkylating an alkylatable hydrocarbon with at least a portion of said isomerized propylene polymer.

2. The process of claim 1 further characterized in that the propylene polymer is isomerized in the presence of a silica-containing catalyst.

3. A process for producing branched chain hydrocarbons which comprises polymerizing propylene, subjecting at least a portion of the resultant polymers to the action of an olefin isomerizing catalyst at isomerizing conditions, and alkylating an alkylatable hydrocarbon with at least a portion of said isomerized propylene polymer.

4. A process for producing branched chain aromatic hydrocarbons which comprises polymerizing propylene, subjecting at least a portion of the resultant polymers to the action of an isomerizing catalyst at isomerizing conditions, and aykylating an aromatic hydrocarbon with at least a portion of said isomerized propylene polymer.

5. A process for producing high octane number gasoline which comprises polymerizing propylene in the presence of a solid phosphoric acid catalyst, isomerizing at least a portion of the resultant polymer in the presence of a silica-containing catalyst, and alkylating isobutane with at least a portion of said isomerized polymer in the presence of a hydrogen fluoride-containing catalyst to form said high octane number gasoline.

6. The process of claim 5 further characterized in that said propylene polymer is separated into a fraction containing hydrocarbons having 6 to 9 carbon atoms per molecule, isomerizing said fraction, and alkylating isobutane with said isomerized fraction.

7. A process for producing a high octane number gasoline which comprises polymerizing propylene in the presence of a solid phosphoric acid catalyst, isomerizing at least a portion of the resultant polymer in the presence of a silica-containing catalyst, and alkylating isobutane with at least a portion of said isomerized polymer in the presence of sulfuric acid catalyst.

GORDON B. ZIMMERMAN.

---

Disclaimer 2,404,340.—*Gordon B. Zimmerman*, Western Springs, Ill. PRODUCTION OF HIGH ANTIKNOCK FUEL. Patent dated July 16, 1946. Disclaimer filed Apr. 12, 1948, by the assignee, *Universal Oil Products Company*.

Hereby enters this disclaimer to claims 1 and 3 of said patent.

[*Official Gazette May 11, 1948.*]

hydrocarbons which may be withdrawn from the said separation zone through line 22 and fed into line 16 to be recycled into alkylation zone 15. The desirable alkylated products removed from separation zone 19 are withdrawn through line 23 into storage or these may be further treated to remove alkyl fluorides or other foreign products formed in alkylation zone 15. The means for treating the alkylation products are not shown on the accompanying diagram but may comprise auxiliary processes such as defluorination towers containing aluminia or other suitable treating agents well known in the art. No novelty for such treating processes or apparatus per se is claimed in the present invention.

The following example is introduced for the purpose of further illustrating the novelty and utility of the present invention, but should not be construed as limiting the same in any of its aspects in accordance thereto.

*Example*

Propylene may be passed over a solid phosphoric acid catalyst at a temperature of 180° C. and at a pressure of 180 pounds per square inch to yield a liquid product comprising primarily propylene trimer having a boiling range of from about 93° C. to about 171° C. and having an octane number of 77.

A $C_6$ to $C_9$ fraction separated from the products of the above polymerization step may be isomerized by passing the hydrocarbons over a silica-alumina-zirconia catalyst at a temperature of 510° C., at atmospheric pressure, and at a space velocity of 15 volumes of liquid charging stock per hour. The resulting isomerized polymer fraction has a clear A. S. T. M. octane number of 81 and a leaded octane number (with 3 cc. tetraethyl lead per gallon) of 83.

A mixture of technical isobutane and the isomerized propylene polymer fraction produced as above containing a molar ration of isobutane to olefin of about 4:1 is charged with an equal volume of hydrogen fluoride into an alkylation reactor at a temperature of 10° C. and with a residence time in the reactor of about 15 minutes. The yield of gasoline boiling range fraction of the alkylation product is about 168%, based upon the weight of polymer fraction charged into the reaction. The alkylate has a clear A. S. T. M. octane number of 89 and a leaded octane number (3 cc. tetraethyl lead per gallon) of 105.

In an alkylation experiment in which process conditions similar to the above are maintained, that is, similar temperatures, pressures, olefin to paraffin ratios, and space time conditions, but utilizing a non-isomerized propylene polymer containing $C_6$–$C_9$ polymers, an alkylate is obtained containing a gasoline boiling range fraction having a clear A. S. T. M. octane number of 79. The leaded octane number for the same fraction (3 cc. of tetraethyl lead per gallon) is 87.

The results indicated by the above comparison show conclusively the advantages obtained by isomerizing the propylene polymer prior to alkylation.

I claim as my invention:

1. The process which comprises polymerizing propylene, subjecting at least a portion of the resultant polymers to the action of an olefin isomerizing catalyst at isomerizing conditions, and alkylating an alkylatable hydrocarbon with at least a portion of said isomerized propylene polymer.

2. The process of claim 1 further characterized in that the propylene polymer is isomerized in the presence of a silica-containing catalyst.

3. A process for producing branched chain hydrocarbons which comprises polymerizing propylene, subjecting at least a portion of the resultant polymers to the action of an olefin isomerizing catalyst at isomerizing conditions, and alkylating an alkylatable hydrocarbon with at least a portion of said isomerized propylene polymer.

4. A process for producing branched chain aromatic hydrocarbons which comprises polymerizing propylene, subjecting at least a portion of the resultant polymers to the action of an isomerizing catalyst at isomerizing conditions, and aykylating an aromatic hydrocarbon with at least a portion of said isomerized propylene polymer.

5. A process for producing high octane number gasoline which comprises polymerizing propylene in the presence of a solid phosphoric acid catalyst, isomerizing at least a portion of the resultant polymer in the presence of a silica-containing catalyst, and alkylating isobutane with at least a portion of said isomerized polymer in the presence of a hydrogen fluoride-containing catalyst to form said high octane number gasoline.

6. The process of claim 5 further characterized in that said propylene polymer is separated into a fraction containing hydrocarbons having 6 to 9 carbon atoms per molecule, isomerizing said fraction, and alkylating isobutane with said isomerized fraction.

7. A process for producing a high octane number gasoline which comprises polymerizing propylene in the presence of a solid phosphoric acid catalyst, isomerizing at least a portion of the resultant polymer in the presence of a silica-containing catalyst, and alkylating isobutane with at least a portion of said isomerized polymer in the presence of sulfuric acid catalyst.

GORDON B. ZIMMERMAN.

---

Disclaimer 2,404,340.—*Gordon B. Zimmerman*, Western Springs, Ill. PRODUCTION OF HIGH ANTIKNOCK FUEL. Patent dated July 16, 1946. Disclaimer filed Apr. 12, 1948, by the assignee, *Universal Oil Products Company*.

Hereby enters this disclaimer to claims 1 and 3 of said patent.

[*Official Gazette May 11, 1948.*]